(12) United States Patent  
Golden (10) Patent No.: US 6,416,605 B1
(45) Date of Patent: Jul. 9, 2002

(54) METHOD FOR MANUFACTURING FLUTED MEDIA

(75) Inventor: Patrick Golden, Roseville, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 09/449,290

(22) Filed: Nov. 24, 1999

(51) Int. Cl.⁷ .............................................. B31C 13/00
(52) U.S. Cl. ........................ 156/192; 156/184; 156/205; 156/207
(58) Field of Search ................................. 156/184, 191, 156/192, 207, 210, 472, 473; 242/541.2, DIG. 3

(56) References Cited

U.S. PATENT DOCUMENTS

| | | |
|---|---|---|
| 2,599,604 A | 6/1952 | Bauer et al. |
| 4,807,825 A * | 2/1989 | Elsner ...................... 242/56 R |
| 5,002,666 A | 3/1991 | Matsumoto et al. |
| 5,049,326 A | 9/1991 | Matsumoto et al. |
| 5,344,091 A * | 9/1994 | Molison ................... 242/527.1 |
| 5,435,870 A | 7/1995 | Takagaki et al. |
| 5,505,402 A | 4/1996 | Vigneau |
| 5,543,007 A | 8/1996 | Takagaki et al. |
| 5,772,883 A | 6/1998 | Rothman et al. |
| 5,792,247 A | 8/1998 | Gillingham et al. |
| 5,820,646 A | 10/1998 | Gillingham et al. |
| 6,179,890 B1 * | 1/2001 | Ramos et al. .................. 55/482 |

* cited by examiner

Primary Examiner—Michael W. Ball
Assistant Examiner—Todd J. Kilkenny
(74) Attorney, Agent, or Firm—Merchant & Gould P.C.

(57) ABSTRACT

Apparatus and method for manufacturing a filter element by winding a fluted media into a coreless roll. The fluted filter media is transported forwardly and a front edge is lifted upwardly by a rearwardly facing inclined ramp. A rearwardly facing surface pushes the front edge rearwardly, and then a downwardly facing surface pushes it downwardly, thereby forming an incipient log, or roll start. The remaining portion of the fluted media is then rolled around the incipient log, thereby making a coreless cylindrical fluted filter media.

25 Claims, 8 Drawing Sheets

METHOD FOR MANUFACTURING FLUTED MEDIA

FIELD OF THE INVENTION

This invention relates generally to methods and machines for manufacturing fluted filter media, and more particularly to a method and apparatus for winding a fluted media into a coreless roll.

BACKGROUND OF THE INVENTION

Spiral wound fluted filter media are well known. Cylindrical fluted filter elements are typically made by winding fluted media about a central mandrel. The mandrel is manually connected to the leading edge of the media and then rolled to wind the media around it. The mandrel is typically left inside the media to plug the center. Connecting the mandrel to the leading edge is labor intensive. The mandrel at times also does not seal reliably to the media in contact with it, providing an undesirable leak path. Using a separate mandrel for each media also adds cost.

Another prior art approach is shown in U.S. Pat. Nos. 5,543,007 and 5,435,870. In that approach, one or more releasable "claws" grip a front edge of the media, the media is rolled around the claws, and then the claws are removed. This approach is also labor intensive in that the claws must be attached and then removed when making each filter. The claw also interferes with the bead of sealant that must be applied on the media, which can result in the claw becoming undesirably glued to the media and, upon removal, possible tears or poor sealing of the media. Claws or other removable mandrels also add complexity in that they require a special means for releasing them from the media. They also add cost in that the opening left behind must be filled with special materials to create a core and provide sealing.

It can be seen that a new apparatus and method is needed for winding a fluted media into a coreless roll without the use of a temporary or permanent mandrel, thereby reducing or eliminating the shortcomings of the prior art discussed above.

SUMMARY OF THE INVENTION

In the invention, the use of a mandrel that grips the front end of the media in order to wind the media around it is eliminated. In addition to the manufacturing cost and other benefits associated with eliminating the mandrel, the invention also results in a complete and reliable seal of the center portion of the wound media.

In one aspect of the method of the invention, a fluted media having flutes with a first end that is closed and a second end that is open, is wound into a coreless roll. The fluted media is sealed transversely across the front end. A sealant is applied on top of the fluted media along a side edge adjacent the second end of the flutes. As the fluted media is transported forwardly, its front edge is lifted upwardly, without gripping, so as to bend the fluted media rearward of the front edge. The front edge is then pushed, without gripping, rearwardly and then downwardly to form an incipient log, or roll start. The remaining portion of the fluted media is rolled around the incipient log, and the back end is sealed to the roll.

In one aspect of the apparatus of the present invention, the apparatus comprises a transport arrangement that moves the fluted media forwardly and structure that facilitates forming an incipient log around which a remaining portion of the fluted media can be rolled. The structure includes a generally rearwardly facing inclined ramp that lifts a front edge of the fluted media upwardly, a generally rearwardly facing surface that then pushes it rearwardly, and a generally downwardly facing surface that then pushes the front edge downwardly. As will be discussed further below, this structure can be any of a number of different configurations within the principles of the invention to achieve winding a fluted media into a coreless roll without the use of a mandrel.

These and various other advantages and features of novelty which characterize the invention are pointed out with particularity in the claims annexed hereto. However, for a better understanding of the invention and its advantages, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding parts throughout the various figures.

DETAILED DESCRIPTION OF THE PREFERRED EMBODIMENT

Figure 1:
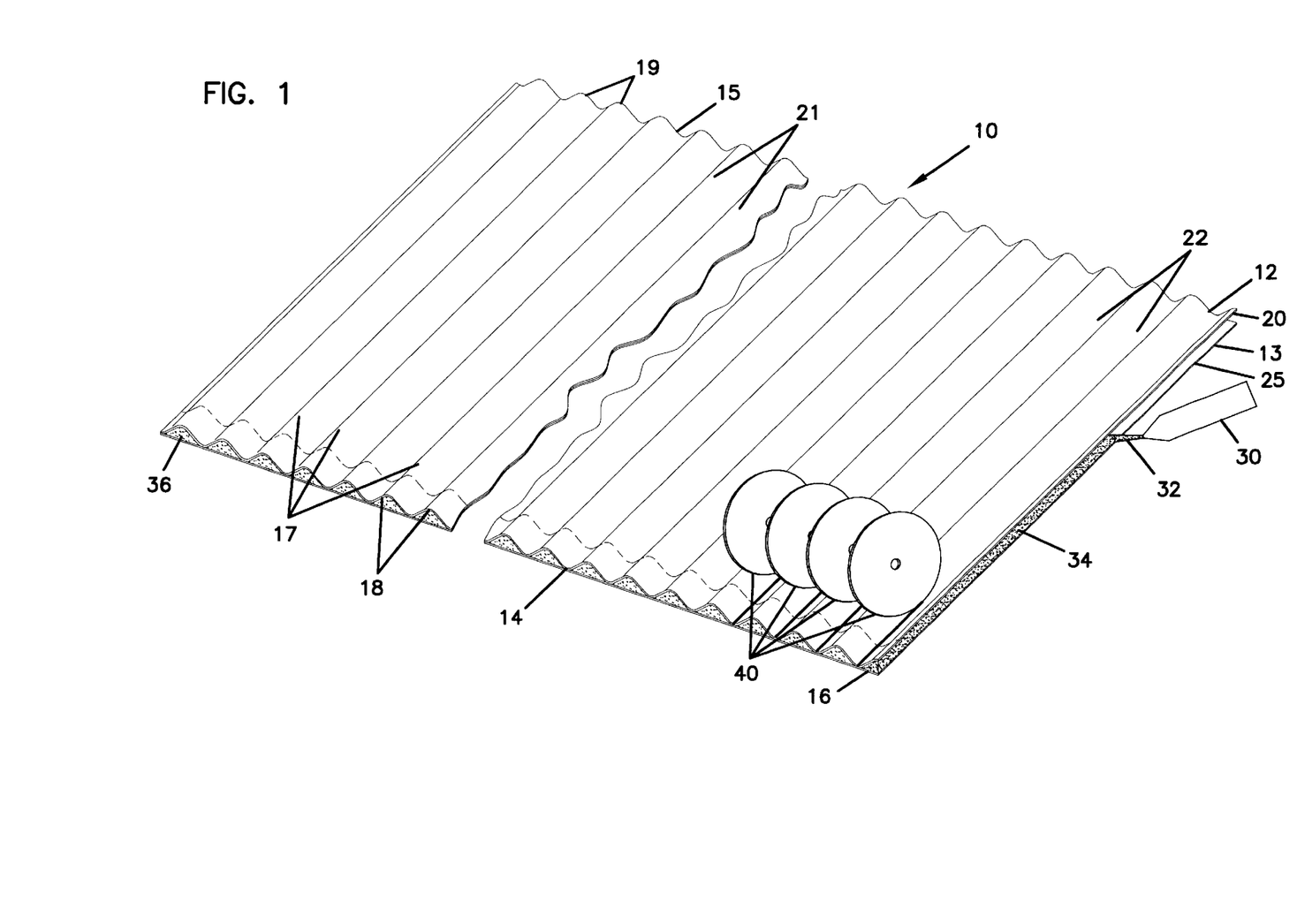
FIG. 1 shows a fluted media according to the present invention, and schematically shows certain steps done in preparing the media for winding according to the present invention.

Referring to FIG. 1, a fluted filter media 10 is shown. Media 10 includes two layers comprising a typically flat, face sheet 25 and a fluted or corrugated sheet 20. A first side edge 14 of fluted filter media 10 is sealed by applying a bead 36 of sealant between fluted 20 and face 25 sheets. In this way, flutes 17 are formed having a first end 18 that is closed and a second end 19 that is open. The construction of fluted filter media 10 is known and is described in for example U.S. Pat. Nos. 5,772,883; 5,792,247; and 5,820,646, which are incorporated by reference.

To prepare fluted filter media 10 for coreless winding, the valleys 22 of at least one of the flutes 17 proximate the front end 12 are scored with scoring wheels 40. Preferably more than one valley and most preferably the first four, are scored. Scoring wheels 40 have an outside radius of 0.012 inches and apply a constant pressure of about ten pounds with independent pneumatic cylinders. The resulting depth of the score is about 20% of the total thickness of sheets 20, 25, which is about 0.020 inches.

This scoring causes front end 12 of fluted filter media 10 to curl, which facilitates rolling. It will be understood that scoring may not be needed.

It is also required that front edge 13 of fluted filter media 10 is sealed to prevent any leaks in the center of the media roll. This is done in the preferred embodiment by cutting fluted filter media 10 at a flute peak 21, thereby forming a half flute 16. Simultaneously with scoring, half flute 16 is also filled with sealant 32 from an applicator 30 to form a front edge sealant bead 34. In addition to meeting the requirement of a front end seal, this half-flute configuration also leaves, after cutting, a corresponding half flute for the next filter. It also facilitates the rolling process, as further discussed below. However, portions of a flute larger or smaller than a half-flute could comprise front end 12. Scoring could also be accomplished for example as a separate step or as part of apparatus 50.

Figure 2:
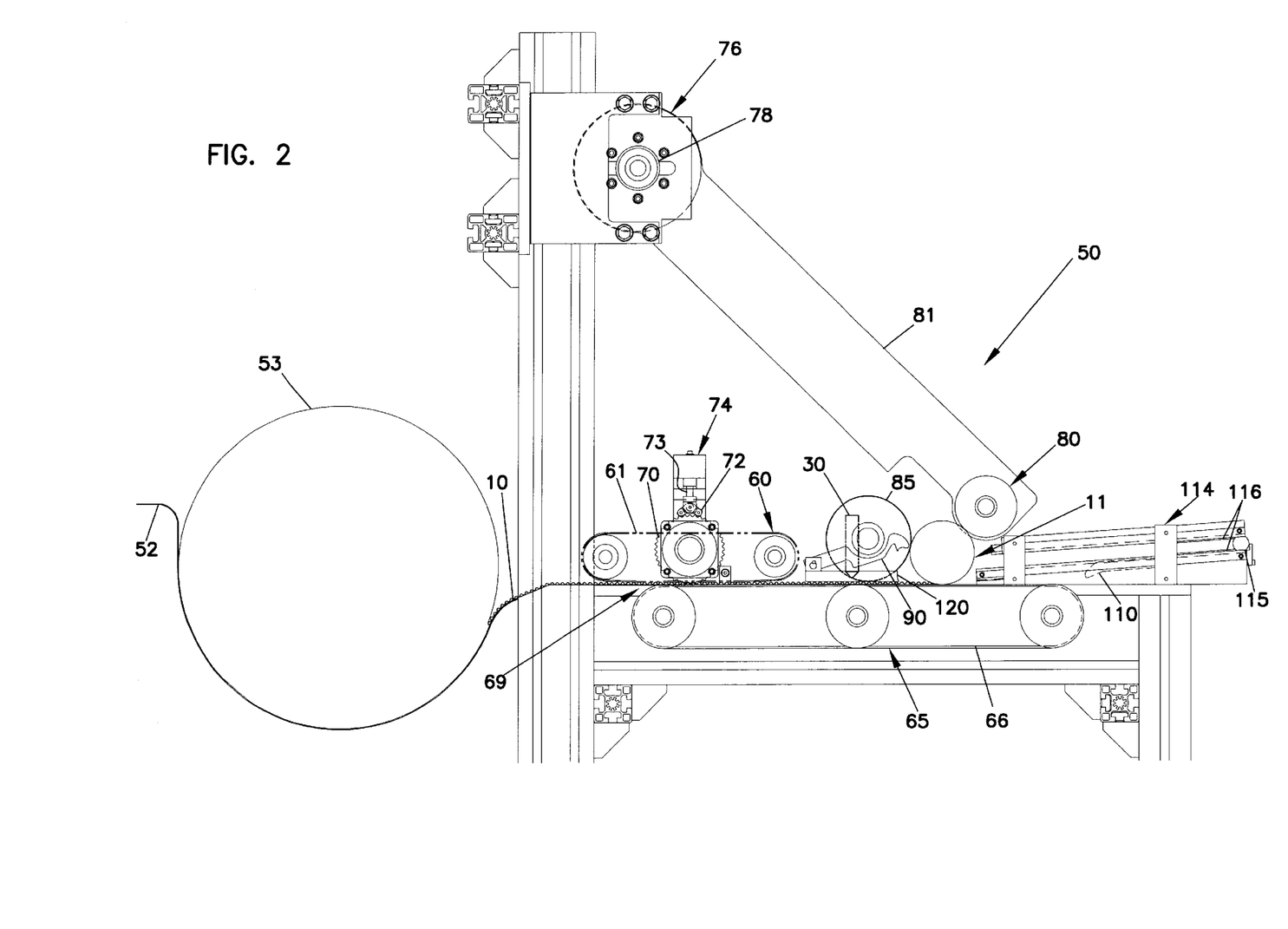
FIG. 2 is a side view of an apparatus for winding a fluted filter media into a coreless roll according to the present invention.
Figure 2A:
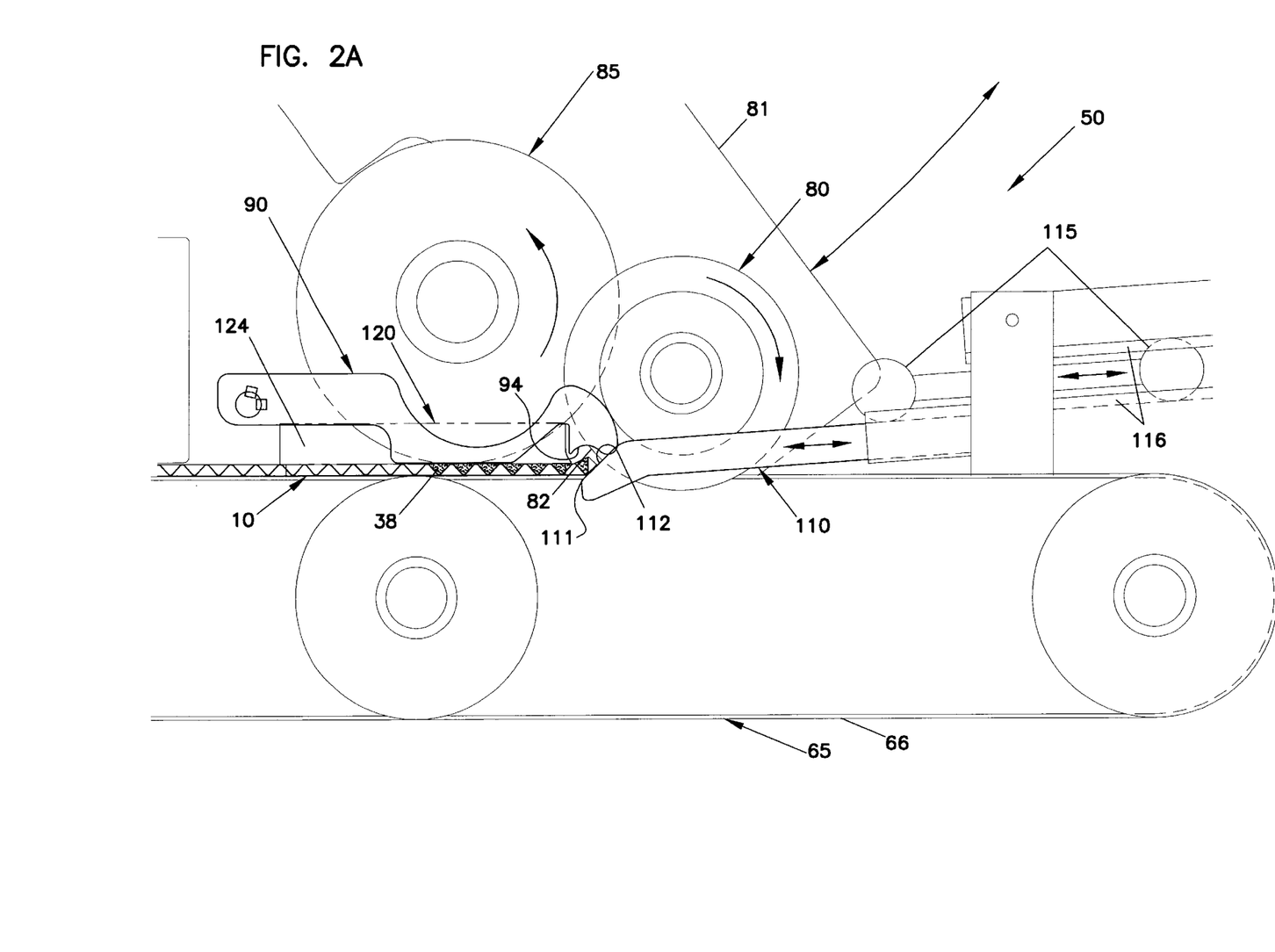
FIGS. 2A–E show a close-up view of a portion of the apparatus of FIG. 2 in various stages of the process of winding a fluted media into a coreless role.

Referring now to FIG. 2, a coreless winding apparatus 50 is shown. A loosely coiled roll 53 of fluted filter media 10, prepared as discussed above, is placed in bin 52 (sealed first side edge 14 is on the far side of roll 53 in FIG. 2). Sealed front edge 13 is guided into nip 69 formed between upper 60 and lower 65 conveyors, which then transport fluted filter media 10 forwardly. Conveyors 60, 65 preferably comprise a plurality (seven each in the preferred embodiment) of tractor belts 61, 66, but it will be understood that a variety of known transport arrangements, for example other conveyors, or rollers, could be employed. After passing the forward end of upper conveyor 60, sealant applicator 30 applies a sealant bead 38 along second side edge 15 (at the near side of roll 53 in FIG. 2). Bead 38 (shown in FIG. 2A) is preferably begun at about 1/16" from front edge 13 of fluted filter media 10 and increases in diameter through the first few revolutions, beginning with an initial diameter of approximately 1/16". This assures a reliable seal at the center of the roll and prevents excessive sealant from being squeezed out the end. When fluted filter media 10 is rolled, bead 38 seals media 10 onto itself, thereby, in combination with the sealant closing first end 18 of flutes, forming the typical "Z-Filter" configuration and flow path for a cylindrical filter element.

In the preferred cylindrical media, first side edge 14 (shown in FIG. 1) is intended to be the upstream side, but the orientation of media could also be reversed. Also, while fluted filter media 10 is preferably rolled with fluted sheet 20 on the inside, it could also be on the outside. While a number of different types of sealant may be used, the sealant for beads 36, 38 is a foamed hot melt, and for bead 34 and the back-end seal is a non-foamed hot melt.

Figure 2B:
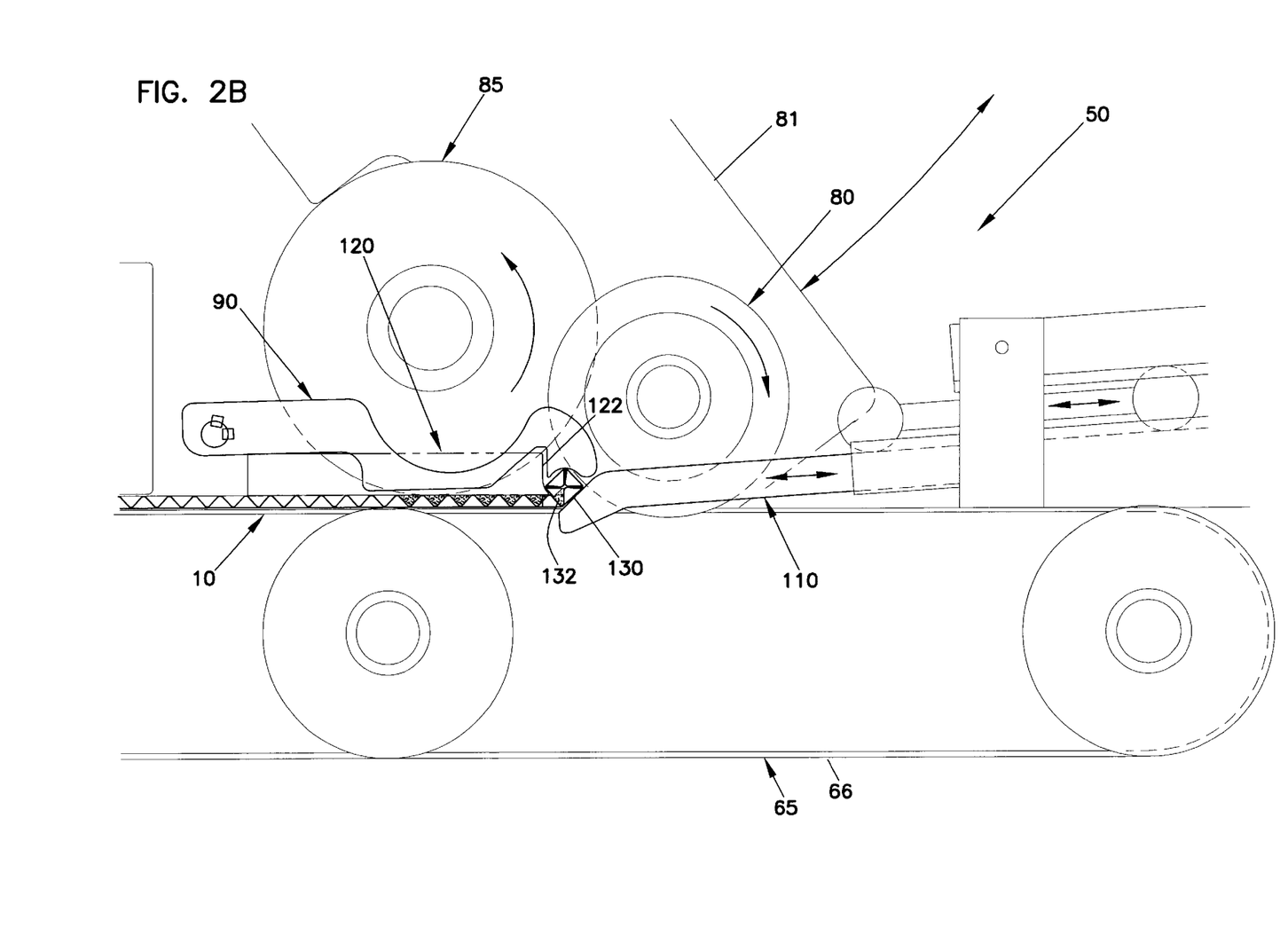

Referring now to FIGS. 2A–E, details of how apparatus 50 winds fluted filter media 10 into a roll 11 are shown. As fluted filter media 10 is transported forwardly, its front edge 13 is lifted upwardly by ramps 112 on lower fingers 110, with ramps 112 having leading edge 111 that extends below the level of media 10. Front edge 13 then encounters rider rollers 80 defining a rearwardly facing surface and turning in a clockwise direction, which, in cooperation with concave surfaces 94 of upper fingers 90, push front edge 13 rearwardly and then downwardly, as shown in FIG. 2B. Concave surface 94 of each upper finger 90 includes rearward 95, downward 96, and forward 97 facing surfaces (identified in FIG. 2E) to facilitate rolling front edge of fluted filter media 10 onto itself. Plate 120, with its forward facing surface 122 including a curved lower end, also cooperates with forward surface 97 of each upper finger 90 to facilitate rolling. In this way, an incipient log or roll start 130 is formed, as shown in FIG. 2B.

So as to provide access to front end 12 of fluted filter media 10 for the components involved in forming incipient log 130, various components are appropriately configured. Upper fingers 90 (13 total in the preferred embodiment) and fixed rollers 85 (7 total) extend into slots 124 of plate 120, and lower fingers 110 (7 total) and rider rollers (seven total) fit in between tractor belts 66 of lower conveyor 65.

It will be understood that the structure for forming an incipient log can take on a variety of orientations and configurations within the principles of the invention. Ramp, rearwardly facing, downwardly facing, and forwardly facing surfaces could be of a variety of orientations, configurations and shapes. For example, a ramp can be curved. These four configurations could also be on a common structure, each on separate structures, or on various combinations of structures. "Without gripping," as used herein, is intended to exclude means, such as a claw, that grab both sides of the fluted filter media. The phrase should otherwise be broadly interpreted, for example to include a tacky surface that grabs only on one side. Structures involved in forming an incipient log can include either moving surfaces (e.g., rotating rider rollers 80) or stationary surfaces (e.g., lower fingers 110).

Preferred incipient log 130 has a particular configuration that is believed beneficial. It is generally square shaped, comprising half flute 16 and the next three flutes 17. All four flute peaks 21 meet at the center, thereby rolling front end 12 as tightly as possible and assuring a reliable seal. Sealant squeezed out from between these flutes goes into and fills half flute-sized space 132, which is one of the reasons for the half flute leading edge configuration.

Figure 2C:
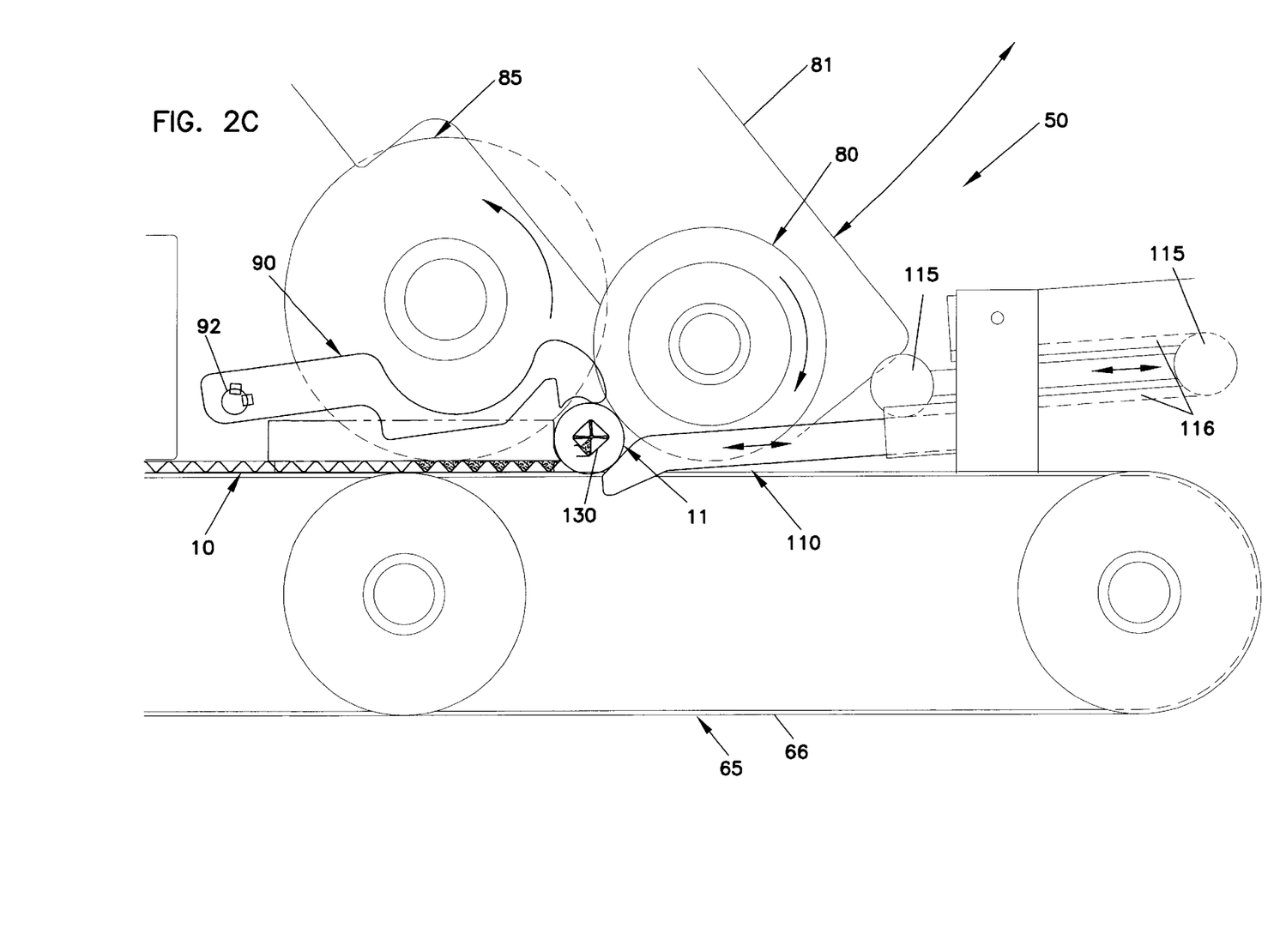
Figure 2D:
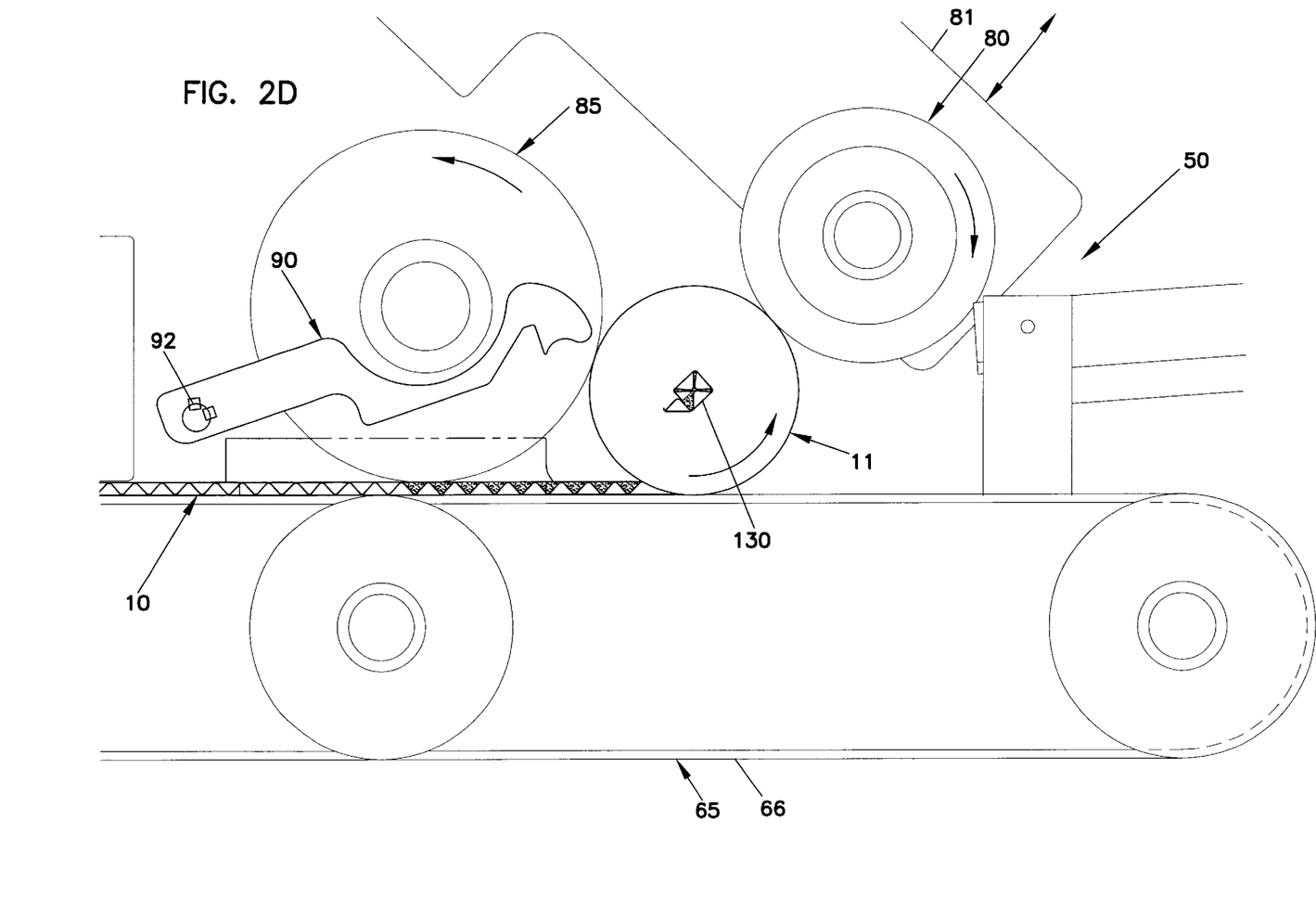
Figure 2E:
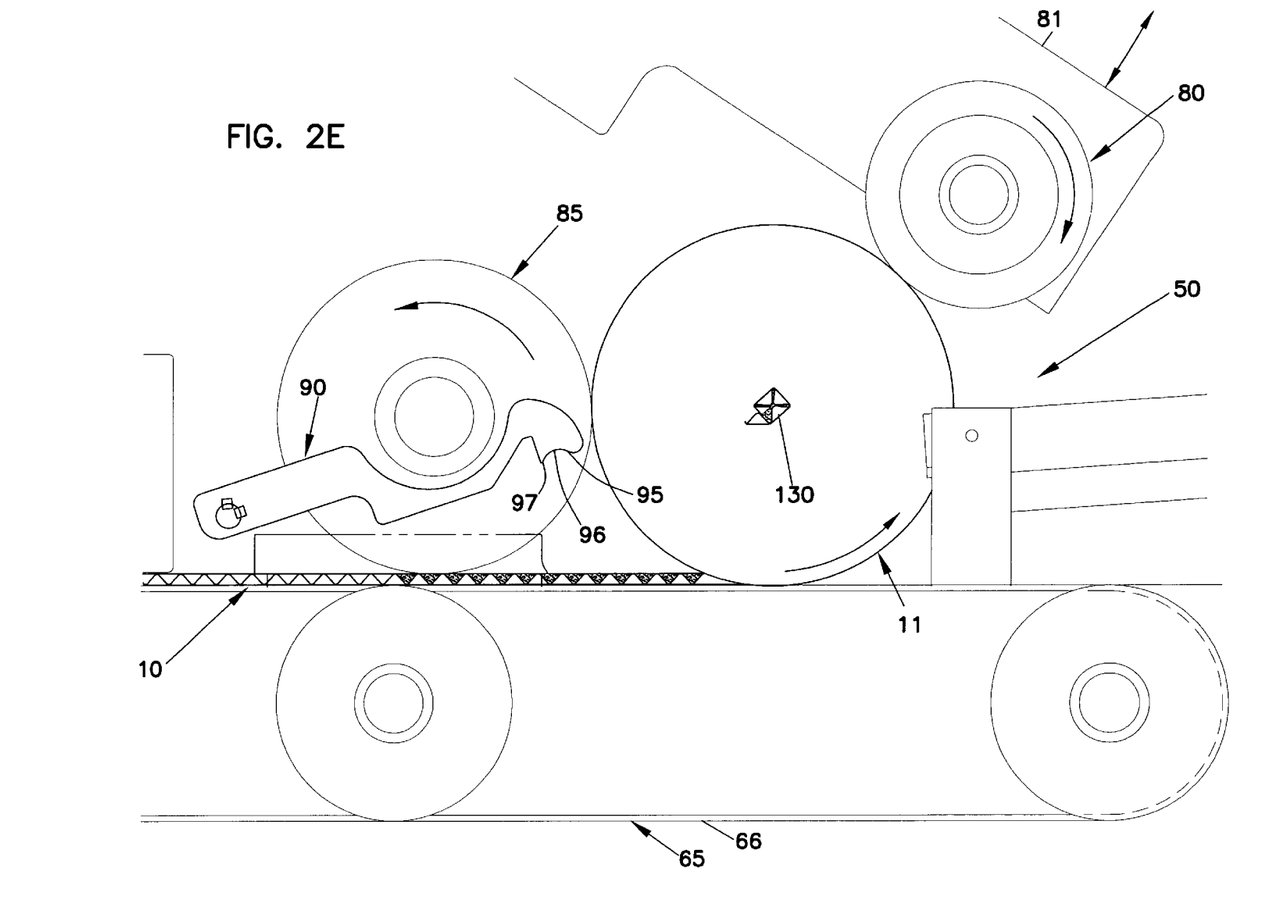

The remaining portion of coiled roll 53 is rolled around incipient log 130, as shown in FIGS. 2C–E. Rider rollers 80 and tractor belts 66 roll media 10 around log 130 until roll 11 is large enough to engage fixed rollers 85, as seen in FIG. 2C. As rollers 80, 85 and belts 66 continue to enlarge roll 11, upper fingers 90 are lifted away, rotating around pivot 92 to a point where they are held in place until it is time to make the next cylindrical media, as shown in FIGS. 2C–E. Lower fingers 110, which slide on wheels 115 and corresponding tracks 116 of guide rail 114, are withdrawn after fixed rollers 85 engage roll 11, as shown in FIGS. 2B and C. Once rollers 80, 85 and belts 66 have rolled the entire coiled roll 53 of a particular media, the cylindrical media is removed from apparatus 50 and its back edge is adhesively sealed to the roll. The cylindrical fluted filter media is now ready for being made into a complete filter element, including adding end rings, gaskets and such.

Rollers 80, 85 are preferably made of rubber having approximately 45–60 Shore A hardness. Fingers 90, 110 are preferably metal, most preferably stainless steel.

Referring to FIG. 2, arm 81 on which rider rollers 80 are positioned is rotated about pivot 78 by motor 76. Rollers 80 are maintained against roll 11 as follows. Fluted wheel 70 is rotated by fluted filter media 10 as it advances through nip 69. When a new coiled roll is being fed into nip 69, orienting trunnion 72 is raised by pneumatic cylinder 73 and then lowered against fluted wheel 70 to assure proper engagement with flutes 17. Fluted wheel 70 is connected to an optical encoder 74 which measures the amount fluted wheel 70 has rotated. A motion control computer, in turn, takes this measurement and directs motor 76 to rotate arm 81 so that a constant pressure by rider rollers 80 against roll 11 is maintained. The pressure must be high enough so that rollers 80 do not slip on roll 11, but low enough so as not to deform roll 11, on the order of about 5 pounds or less.

Figure 3:
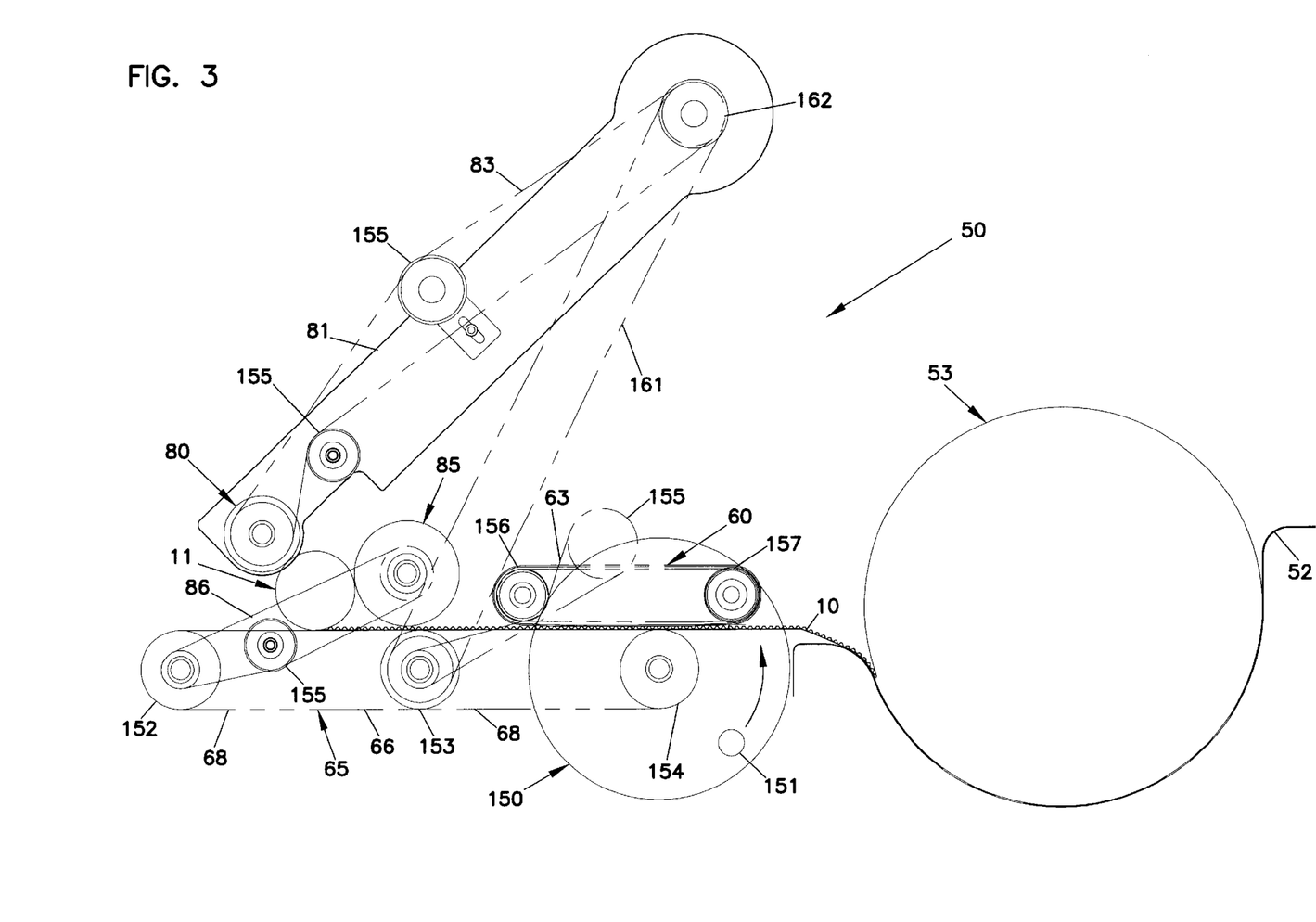
FIG. 3 is a schematic representing an opposite side of the apparatus of FIG. 2 and showing the drive and connection mechanisms of various components.

The drive mechanism for the various rotating parts is shown schematically in FIG. 3, which shows the side of apparatus 50 opposite the side of FIG. 2. The main drive 150 is rotated manually by handle 151 in the direction indicated. Main drive turns first lower conveyor pulley 154, which in turn drives second pulley 152 through tractor belts 66. Another belt 68 connects second pulley 152 to intermediate drive pulley 153. Upper conveyor 60 and tractor belts 61 are driven by connecting belt 63 extending between first upper conveyor wheel 156 and intermediate drive pulley 153.

Fixed rollers 85 are driven by connecting belt 86 coming off of second lower conveyor pulley 152. Rider rollers 80 are driven by connecting belt 83 and pulley 162 which in turn is driven by arm connecting belt 161 and intermediate drive pulley 153. The various belts and wheels are toothed to ensure proper engagement. Idler wheels 155 are also employed in various places to maintain tension. In this way, conveyors 60, 65 and rollers 80, 85 are driven in a synchronized fashion so as to rotate at the same rate.

It will be appreciated that many aspects of coreless winding apparatus 50 could be further automated so as to further minimize the manual interaction required.

It is to be understood that, even though numerous specific characteristics and advantages of the present invention have been set forth in the foregoing description, together with details of the structure and function of the invention, this disclosure is illustrative only, and changes may be made in detail, especially in matters of shape, size, arrangement of parts, and order of steps, within the principles of the invention to the full extent indicated by the broad general meanings of the terms in which the following claims are expressed.

I claim:

1. A method of manufacturing, in an automated process, a filter element by winding a fluted media into a coreless roll, the flutes of the media having a first end that is closed and a second end that is open, the manufacturing method comprising:

(a) sealing a front end of the fluted media transversely across the front end and scoring a valley of at least one flute proximate the front end to facilitate curling of the front end;

(b) transporting the fluted media forwardly;

(c) applying a sealant on top of the fluted media along a side edge of the media adjacent the second end of the flutes;

(d) lifting, without gripping, a front edge of the fluted media upwardly as it moves forwardly;

(e) pushing, without gripping, the front edge rearwardly and then downwardly so as to form an incipient log; and (f) rolling the remaining portion of the fluted media around the incipient log.

2. A method according to claim 1, wherein sealing the front end of the fluted media comprises sealing the front edge.

3. A method according to claim 2, wherein sealing the front end of the fluted media comprises:

cutting through the fluted media generally along a peak of a flute; and filling the remaining flute portion with sealant.

4. A method according to claim 1, wherein the step of applying a sealant on top of the fluted media is done as the media is transported forwardly.

5. A method according to claim 1, wherein lifting a front edge upwardly includes positioning an inclined ramp in the path of the forward moving front edge.

6. A method according to claim 5, wherein the inclined ramp remains under the front end of the fluted media while the incipient log is formed.

7. A method according to claim 1, wherein the step of pushing the front edge rearwardly and downwardly is done by at least two separate structures.

8. A method according to claim 1, wherein the step of lifting the front edge is accomplished by a plurality of rearwardly extending fingers, and the step of pushing the front edge rearwardly and downwardly is accomplished at least in part by a plurality of forwardly extending fingers.

9. A method according to claim 1, wherein the incipient log comprises at least a portion of the first flute at the front edge, and the next three flutes, the peaks of the four flutes coming in close proximity to one another proximate a center of the log.

10. A method according to claim 1, wherein applying a sealant on top of the fluted media includes starting a bead of sealant approximately 1/16 inch from the front edge.

11. A method according to claim 1, wherein the step of rolling the media around the incipient log is accomplished by at least a roller and a conveyor engaging the fluted media on different sides of the roll.

12. A method according to claim 1, further including the step of pushing, without gripping, the front edge forwardly, after pushing it rearwardly and downwardly, to further facilitate formation of the incipient log, the step being accomplished by a forwardly facing surface.

13. A method according to claim 1, wherein said step of scoring a valley of at least one flute proximate the front edge to facilitate curling of the front end includes scoring a valley of a plurality of flutes.

14. A method according to claim 1, wherein the steps of scoring a valley and sealing the front end are accomplished simultaneously.

15. A method according to claim 1, wherein the coreless roll is a cylindrical roll.

16. A method according to claim 1 wherein:

(a) said step of scoring a valley of at least one flute includes scoring a valley of at least two flutes.

17. A method according to claim 1 wherein:

(a) said step of scoring a valley of at least one flute includes scoring a valley of four flutes located proximate to the front edge.

18. A method according to claim 1 wherein:

(a) said step of scoring a valley of at least one flute includes providing a score depth of 20% of a total thickness of the media in the valley of the at least one flute.

19. A method of manufacturing, in an automated process, a filter element by winding a fluted media into a coreless roll, the flutes of the media having a first end that is closed and a second end that is open, the manufacturing method comprising:

(a) sealing a front edge of the fluted media transversely across the front edge including cutting through the fluted media generally along a peak of a flute and filling the remaining flute portion with sealant;

(b) transporting the fluted media forwardly;

(c) applying a sealant on top of the fluted media along a side edge of the media adjacent the second end of the flutes;

(d) lifting, without gripping, the front edge of the fluted media upwardly as it moves forwardly;

(e) pushing, without gripping, the front edge rearwardly and then downwardly so as to form an incipient log; and (f) rolling the remaining portion of the fluted media around the incipient log.

20. A method according to claim 19, wherein the step of applying a sealant on top of the fluted media is done as the media is transported forwardly.

21. A method according to claim 19, wherein lifting a front edge upwardly includes positioning an inclined ramp in the path of the forward moving front edge.

22. A method according to claim 16, wherein the step of lifting the front edge is accomplished by a plurality of rearwardly extending fingers, and the step of pushing the front edge rearwardly and downwardly is accomplished at least in part by a plurality of forwardly extending fingers.

23. A method according to claim 16, further including scoring a valley of at least one flute proximate the front edge to facilitate curling of the front edge.

24. A method according to claim 23, wherein the steps of scoring a valley and sealing the front edge are accomplished simultaneously.

25. A method according to claim 23 wherein:
(a) said step of scoring a valley of at least one flute includes scoring a valley of at least two flutes.

* * * * *

UNITED STATES PATENT AND TRADEMARK OFFICE
CERTIFICATE OF CORRECTION

PATENT NO.   : 6,416,605 B1
DATED        : July 9, 2002
INVENTOR(S)  : Patrick Golden It is certified that error appears in the above-identified patent and that said Letters Patent is hereby corrected as shown below:

Column 7,
Line 1, delete "16" and insert -- 19 --;
Line 6, delete "16" and insert -- 19 --.

Signed and Sealed this

First Day of April, 2003

JAMES E. ROGAN
*Director of the United States Patent and Trademark Office*